Feb. 24, 1970   L. F. STENGEL   3,496,871
ENERGY CONVERSION DEVICE
Filed Sept. 13, 1967   3 Sheets-Sheet 1

Inventor
Linda F. Stengel
By
George W. Pikes
Attorney

Feb. 24, 1970　　　L. F. STENGEL　　　3,496,871
ENERGY CONVERSION DEVICE
Filed Sept. 13, 1967　　　　　　　　　　　　3 Sheets-Sheet 2

Inventor
Linda F. Stengel,
By *George S. Baker*
Attorney

Feb. 24, 1970   L. F. STENGEL   3,496,871
ENERGY CONVERSION DEVICE

Filed Sept. 13, 1967   3 Sheets-Sheet 3

Inventor
Linda F. Stengel
By
George Pikes
Attorney

United States Patent Office 3,496,871
Patented Feb. 24, 1970

3,496,871
ENERGY CONVERSION DEVICE
Linda Folkard Stengel, Los Angeles, Calif., assignor to Entropy Limited, Toronto, Ontario, Canada, a corporation of Canada
Filed Sept. 13, 1967, Ser. No. 667,592
Int. Cl. F04b *19/00;* H02k *41/00*
U.S. Cl. 103—1    10 Claims

ABSTRACT OF THE DISCLOSURE

A generator or pump comprising a coil wound toroidal pipe with inlet and outlet ports and having at least two permanently magnetized pistons located within and free to orbit around the pipe. The passage of fluid through the pipe propels the magnetic piston or pistons to orbit within the toroidal pipe, thereby inducing electric current in the surrounding coils, while alternatively the passage of electric current through said coils propels the magnetic pistons or pistons to orbit within the toroidal pipe thereby inducing circulation of the liquid through said pipe.

BACKGROUND OF THE INVENTION

This invention relates to an energy conversion device for selectively converting fluid pressure energy into electrical energy and for converting electrical energy into fluid pressure energy, such as in generators, pumps and the like. This invention further relates to energy conversion devices for converting one form of electrical energy to another form of electric energy, such as for the conversion of D.C. current energy to A.C. current energy.

DESCRIPTION OF THE INVENTION

The energy conversion device of the present invention comprises a hollow tubular pipe of circular form in plane to provide an endless cylindrical closed circuit, at least two pistons of permanently magnetised metal are mounted in the tubular pipe for free orbit therein. The magnetic poles of the pistons are aligned coaxially and oriented to have like poles facing each other. The tubular pipe has fluid inlet and outlet ports through which fluid is admitted to and from the cylinder and energizable coil windings surrounding at least a part of the tubular pipes.

The hollow pipe may be formed into any shape which defines a closed circuit for the orbiting motion of the magnetic piston means and which encompasses no abrupt bends in the pipe which could interfere with the orbiting motion of the magnetic piston means. While many configurations of hollow pipe (e.g. toroidal, helical with the ends joined, and the like) may be used, the circular ring-shaped configuration is preferred.

The magnetic piston means consists of at least one magnetic piston. It is preferable that each such magnetic piston be cylindrical in form and with opposite poles on opposite ends of each cylinder. For efficient operation the magnetic pistons should be of sufficiently large cross-section to effect good sealing with the inner surface of the hollow pipe against the leakage of fluid. When two or more magnetic pistons are used the pistons are oriented to have like poles face each other which maintains the pistons in spaced apart relationship.

The novel device of this invention has two distinct modes of operation.

The method of operating the energy conversion device of this invention as a generator of electricity comprises maintaining the operating temperatures below the Curie temperature for the material of the magnetic pistons, and introducing the fluid at a pressure greater than the ambient pressure into the hollow pipe through the inlet port, whereby the fluid propels each magnetic piston to orbit in the hollow pipe to thereby induce electric current in the coil windings.

The method of operating the novel energy conversion device as a pump for fluids comprises introducing a fluid at ambient pressure into the hollow pipe and then passing an electric current through the coil windings, whereby the magnetic field induced in the coil windings by the electric current serves to propel the magnetic pistons and to thereby circulate the fluid from the intake port to the outlet port.

In the generator mode the fluid used may be a cold gas, a hot gas, or a liquid. In the pump mode, the fluid pumped may be liquid or gaseous.

In the generator mode, fluid (liquid or gaseous) enters the device through the inlet port at a velocity $c$ greater than the velocity $u$ at which the magnetic pistons orbit within the hollow pipe. This results in an energy transfer proportional to $(c-u)u$ from the fluid to the magnetic pistons. By inductive coupling between the magnetic piston fields and the coil windings, the orbiting motion of the magnetic pistons induces alternating current in the coil windings. The fluid leaves the outlet port after one orbit, while each magnetic piston continues in its path about the torus.

In the pump mode, alternating current (preferably, but not strictly necessarily, 3-phase) is supplied to the coil windings to generate an orbiting electromagnetic field and thereby to inductively cause the magnetic pistons to orbit within the hollow toroidal shaped pipe. Fluid (liquid or gaseous) is entrained at the intake port between orbiting magnetic pistons and is discharged at the outlet port, thereby effecting fluid transfer through the hollow pipe.

The following examples serve to illustrate some embodiments of the novel device in the generator mode.

EXAMPLE 1

The novel device of this invention may be inserted between the exhaust manifold and the exhaust muffler of an otherwise conventional internal combustion engine (diesel or gasoline, 4-stroke or 2-stroke and the like), and serves then to replace the conventional generator or alternator. (This application is described hereinafter as a specific embodiment of the invention.)

In conventional unsupercharged internal combustion engines, the energy of the exhaust gases in the blowdown phase (cylinder pressure appreciably above atmospheric pressure) is not utilized and is therefore wasted. The purpose of using a device according to the present invention is to extract at least a portion of this blowdown energy and convert it into useful electric energy. The advantages are then twofold (assuming proper design, so that no additional back pressure on the engine is created). First, the device replaces the conventional generator or alternator, both of which are belt-driven in a typical engine; this saves engine power and cost. Second, since the device extracts energy from the exhaust gas, it also makes possible the use of a smaller exhaust muffler (less weight, volume and cost) while still complying with noise limit regulations.

EXAMPLE 2

The device may be used in conjunction with a compressed-gas source (compressed air bottle or solid-fuel hot-gas generator cartridge) as an intermittent source of electric power.

In areas removed from an accessible electric power line, electric energy may be needed at low power levels and for short periods of time only (example: emergency radio set). As an illustrative case, the energy retrievable from a standard Scuba tank at 225 p.s.i.g. and 71.2 cu. ft. standard air content is of the order of 50 watt-hours, or 1 kw. for 6 minutes of operation.

EXAMPLE 3

The device may replace a turbogenerator used as an auxiliary electric power unit in general-aviation aircraft applications.

Normal procedure is to mount a turbogenerator package outboard on a strut, and exposed in flight to the airstream. The turbine converts airspeed (ram pressure) into shaft work, which in turn drives an electric generator to provide in-flight electric power. The disadvantages are cost and direct air drag (plus possible turbulent-wake interference downstream of the turbogenerator package). According to the present invention, only a simple air scoop need protrude beyond the fuselage skin. An air duct of arbitrary shape may then lead to the device, which can be mounted in any space conveniently available inside the fuselage. This is likely to save drag, cost, weight and volume.

EXAMPLE 4

The device may be powered by an incompressible medium (e.g. water) available at modest pressure.

There are diversity of situations in which a liquid is available at modest pressure and delivery rate; if pressure and delivery rate are both variable, conventional devices (hydraulic turbines) tend to operate poorly unless fitted with expensive compensating devices (which are uneconomical at low ratings). The present device is likely to reflect such pressure and delivery variations in amplitude and frequency of the delivered current, which can be controlled in a known manner, rather than in grossly inefficient operation per se.

EXAMPLE 5

The device may operate in "parasitic" mode if interposed between a cryogenic (low temperature) liquid storage and a gaseous end use.

Consider a space system incorporating an oxygen (or other breathing atmosphere) supply stored as liquid in a well-insulated low-temperature container. The medium is then made available at a controlled pressure and delivery rate by a suitable set of control valves plus a heat exchanger. The heat exchanger admits heat controllably to the liquid medium. The evaporated portion serves to pressurize the storage system, ensuring delivery of vapor at a regulated rate. It is suggested to insert the device according to the invention between a cryogenic liquid storage tank and end utility (e.g. breathing mask), and to admit heat to the heat exchanger at a slightly excessive rate. This generates additional system vapor pressure sufficient to operate the device and to replace the present fuel cells.

EXAMPLE 6

The device may operate in generator mode to convert D.C. current into A.C. current. For this purpose, D.C. current is supplied to a recirculating fluid pump with integral D.C. drive motor. The pump outlet is connected to the inlet section of the device, and the pump intake is connected to the outlet section of the device. The D.C. current, acting through the D.C. motor, drives the pump, which causes fluid to recirculate through the device and thereby to propel the magnetic pistons in orbiting motion. The constant-velocity movement of the magnetic pistons through suitably arranged coil windings induces therein a substantially pure sinusoidal alternating current. Conventional technological means for the same purpose employ either an A.C. generator directly driven by a D.C. motor, or various electrical and electronic means for "chopping" the D.C. current into an alternating square wave or a superposition of square waves, in order to achieve thereby an approximation but never a pure sinusoidal alternating current.

In the pump mode, application of a 3-phase alternating current to the coils surrounding the ring-shaped hollow pipe or torus induces an electromagnetic field travelling around the torus and propelling the magnetic pistons. Fluid entrained between the permanently magnetized pistons is displaced from intake toward outlet. In this mode, the device therefore functions as a positive-displacement circulating pump. If individual coil segment lengths around the torus remain constant, the volumes between successive permanently magnetized pistons also remain constant and the device is then suitable to circulate fluids without compression. If individual coil segment lengths decrease in the direction of piston travel around the torus, the volumes between permanently magnetized pistons gradually decrease as the permanently magnetized pistons travel from intake to outlet, and a modest amount of compression can be attained.

Conventional pumps require seals (piston rings for reciprocating pumps, shaft seals for rotary pumps). The present device serves therefore particularly well as re-circulating pump for fluids which must be kept within a sealed fluid circuit. Examples of such fluids include:

liquid alkali metals (sodium, potassium) and similar liquid or gaseous heat exchange media in the primary loop of a fission reactor;
corrosive liquids and gases in chemical process plants;
liquid edible materials which must not be contaminated by contact with lubricants normally encountered in conventional pumps;
chemical and biochemical fluids in laboratories and process pilot plants requiring uncontaminated handling.

For a thorough understanding of the present invention and its many advantages, reference is made to the following detailed description of one illustrative embodiment taken in conjunction with the accompanying drawings in which.

Figure 1:
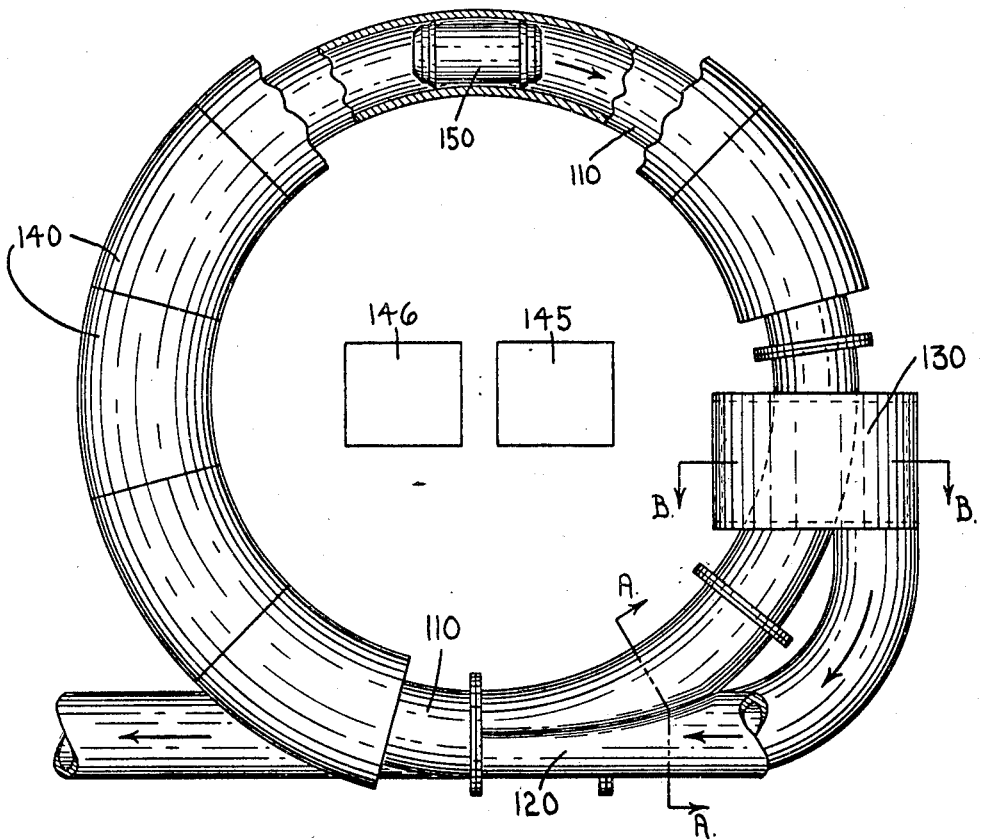
FIGURE 1 is a schematic top view of one embodiment of the invention.
Figure 2:
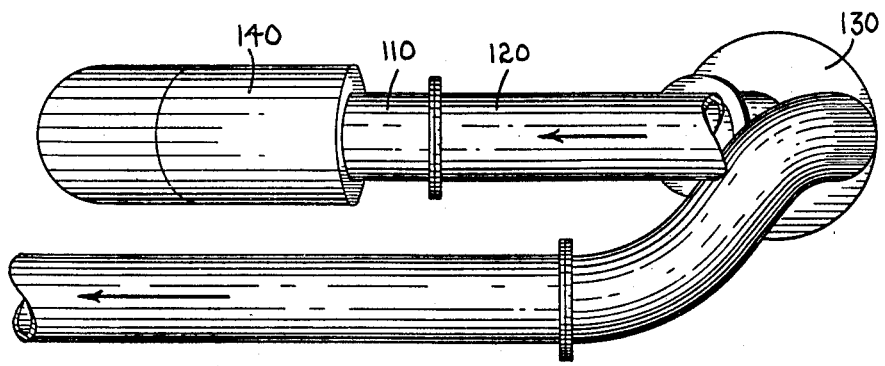
FIGURE 2 is a schematic side view of the same embodiment.

Referring to FIGURES 1 through 9, an embodiment of the invention is schematically illustrated. The operating fluid is assumed to be hot exhaust from the exhaust manifold of an internal combustion engine. FIGURES 1 and 2 show a structure composed of a torus 110 having an inlet port or intake section 120 and an outlet port or exhaust section 130, provided with coils 140 and containing therewithin a number of permanently magnetic pistons 150.

Except for the intake and exhaust sections, the torus is a pipe having circular cross-section, constant wall thickness and constant radius of curvature. Preferred materials for the torus have low surface friction and low magnetic reluctance; an example being stainless steel tubing with smooth inside bore.

Figure 6:
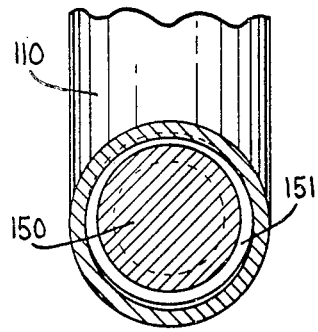
FIGURE 6 is a schematic view of a straight dipole cylinder.
Figure 5:
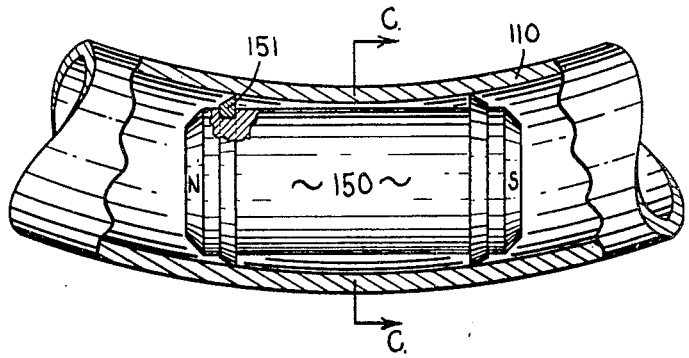
FIGURE 5 is a schematic cross-section along line B—B of FIGURE 1.
Figure 7:
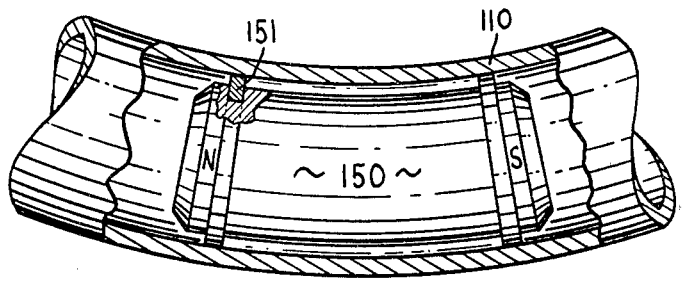
FIGURE 7 is a schematic cross-section along line C—C of FIGURE 6.
Figure 8:
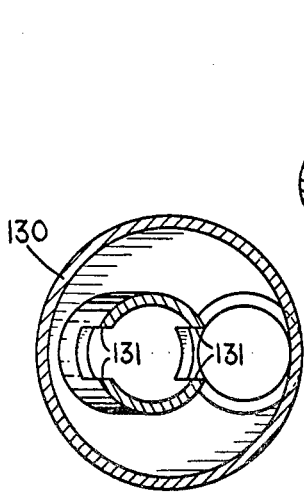
FIGURE 8 is a schematic view of a modified permanently magnetic piston cylinder (arcuate axis).

FIGURES 6 and 7 show one design for the magnetic piston 150 (hereinafter referred to as straight version); FIGURE 8 shows another design for the magnetic piston (hereinafter referred to as curved version). In either case, the preferred material is ferromagnetic and of high field strength (examples: soft iron, AlNiCo alloy; the sole restriction being that the operating temperature of the piston must not exceed the Curie temperature of the material selected), and magnetized axially so as to have its magnetic poles at either end, as schematically indicated by the letters N and S in FIGURES 6 and 8. The straight version may be machined simply from bar stock, while the curved version may be produced by casting a torus of appropriate cross-section, sawing the torus into curved segments of appropriate length, and performing finishing machining operations. Both straight version and curved version may conveniently have beveled end faces, and are provided with machined grooves seating piston rings 151. The piston rings are preferably made with very smooth surfaces so as to reduce friction. Their purpose is to support the permanently magnetized pistons 150 in torus 110 and to provide sealing, as will be explained hereinafter.

As evident from comparison of FIGURES 6 and 8, the average air gap between permanently magnetized pistons 150 and torus wall 110 is larger for the straight version, which detracts from effective induction between permanently magnetized pistons 150 and coils 140. The choice between straight and curved versions therefore rests on an economic compromise between machining cost and inductive efficiency.

The preferred number of permanently magnetized pistons 150 for a given torus size is such that, assuming equal spacing of cylinders around the torus, the torus volume elements between cylinder (hereinafter referred to as cells) are comparable in length to the piston length; the piston rings 151 then provide sealing between successive cells. Furthermore, it is desirable to have an even number of permanently magnetized pistons, and to have their polarities arranged such that adjacent end faces of successive permanently magnetized pistons have like magnetic polarity. The reason for this requirement is evident: given unlike polarity, the field lines of successive permanently magnetized pistons would preferentially run across the cell separating the two permanently magnetized pistons thereby detracting from effective inductive coupling between permanently magnetized pistons 150 and coils 140; whereas given like polarity, all field lines associated with a given piston are compelled to run to the opposite pole on the same piston, thereby tending to run largely through the coil windings and contributing to effective inductive coupling.

Figure 4:
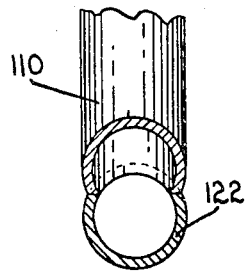
FIGURE 4 is another schematic cross-section along line A—A of FIGURES 1 and 3.
Figure 3:
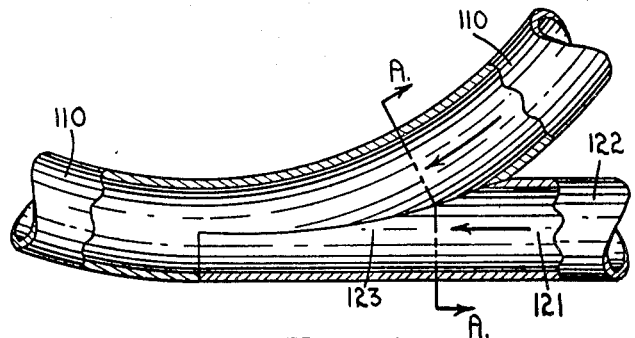
FIGURE 3 is a schematic cross-section of the inlet port of the structure of FIGURE 1.

FIGURES 3 and 4 show schematic cross-sections through the intake section 120. It is assumed that exhaust gases from the exhaust manifold enter the structure through passage 121 in duct 122 at a pressure of up to 15 p.s.i.g. and at a velocity up to the local sonic velocity of the exhaust gas. The transition section from duct 122 to torus 110 guides the incoming exhaust gas into torus 110 through passage 121 cut into the torus wall. The specific shape and construction of the inlet section are not critical except for the following requirements: changes in flow direction and flow cross-section must be gradual; the inflowing gas stream in cross-section 121 must be directed along the tangent to the torus (as seen from above); and the length of passage 121 in circumferential direction along the torus should be approximately twice the length of permanently magnetized pistons 150, for reasons explained below.

FIGURE 8 is a schematic cross-section through the outlet section 130. In the simple version shown here, torus 110 is provided with two lengthwise slits 131, extending preferably a length approximately equal to, or longer than, the length of a piston 150. As a piston 150 passes through the outlet section 130, gas escapes through the slits 131, thereby leaving the novel device and providing space for the gas which enters the device via passage 121.

Figure 9:
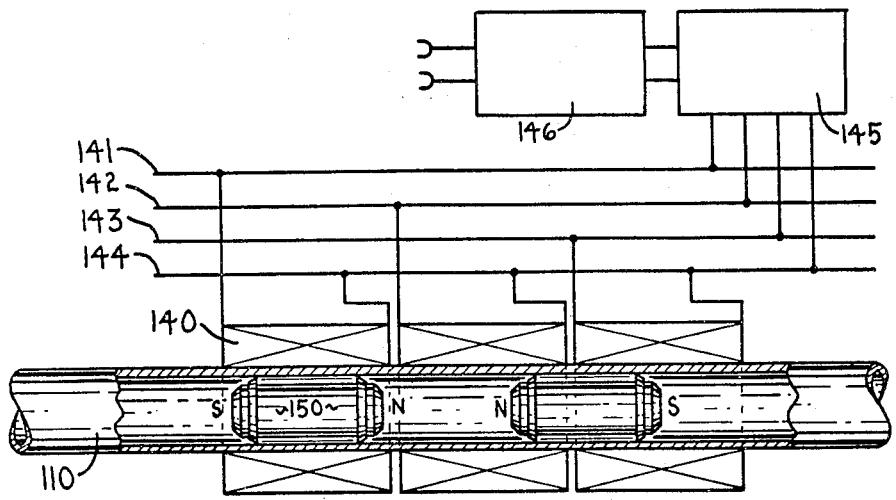
FIGURE 9 is a schematic electrical diagram for an embodiment of the invention.

FIGURE 9 shows schematically part of the coil windings around torus 110; both coil windings 140 and torus 110 being represented for convenience in straight line instead of in curvature. The coil windings consist of individual winding segments 140, each extending for approximately four thirds of the length of one piston 150. The right-hand ends of all coils are connected to a common ground line 144. The left-hand ends are cyclically connected to collector lines 141, 142 and 143. Collector lines 141, 142 and 143 in turn enter a rectifier 145 and a voltage regulator 146, which in turn is connected to an accumulator (not shown).

Referring now to FIGURE 1, a preferred manner of operating the device is described. Consider eight approximately equally spaced permanently magnetized pistons 150 orbiting within torus 110 at some average velocity $u$. Consider further a gas stream at some pressure $p > p_0$ and velocity $c > u$ arriving at the intake section 120 ($p_0$ is the ambient pressure of the gas within the torus 110 and $u$ is the piston velocity). The possibility of a non-stationary flow condition such that both $p$ and $c$ cyclically vary with time must be noted.

Referring to FIGURE 4, the inflowing gas passes through passage 125 into torus 110. It has already been specified that permanently magnetized pistons 150 are approximately equally spaced, and that the length of passage 121 along the torus circumference is approximately twice the length of a piston 150. Therefore, regardless of the instantaneous position of any piston 150, the inflowing gas will always encounter approximately one-half of the passage 121 unblocked by any obstruction.

Entering now into a gas cell between successive permanently magnetized pistons, the gas is slowed down from its inrushing velocity $c$ to the piston orbiting velocity $u$. This results in the transfer of momentum proportional to $(c-u)$ and of an energy proportional to $(c-u)u$ from the inrushing gas to the cylinders during a single orbit. It is perferred that $c$ be equal to approximately $2u$. In consequence, the permanently magnetized pistons are maintained at their orbiting velocity against the resistances due to wall friction and due to the inductive coupling with the surrounding coil windings 140. The pressure of the gas during orbit between the inlet and outlet ports is approximately equal to the static pressure of the gas. After completion of nearly one orbit, the excess gas enters the outlet section 130 shown in FIGURE 8 and passes through slits 131 into the outlet duct leading to the exhaust muffler, while completing its expansion to back pressure $p_0$. This completes the transfer of energy from gas to permanently magnetized pistons.

Referring now to FIGURE 9, the transfer of energy from the permanently magnetized pistons 150 to the coil winding segments 140 will be described. Each piston is accompanied by a magnetic dipole field linking its north pole with its south pole. Since like poles of successive permanently magnetized pistons face each other, most of the field lines pass from one pole through the coil windings 140 to the pole of opposite polarity located at the opposite end of the same piston, thereby inducing electric current in the coil winding segments.

It is necessary to subdivide the total winding length into individual segments separately and cyclically connected, since otherwise the currents induced by the passage of successive poles would tend to cancel each other. The arrangement shown in FIGURE 9 is believed to be particularly advantageous in that it employs conventional 3-phase wiring and components while accomplishing an effective separation of locally and instantaneously induced currents according to their respective phases. The 3-phase alternating current induced in the coil windings, and separated in collector lines 141, 142 and 143, is then converted into direct current in rectifier 145, and regulated as to voltage in regulator 146, in a conventional manner, before being supplied to the accumulator which forms part of the internal combustion engine under contemplation.

While the novel energy-conversion device has been described with particular reference to its application as a pneumatic generator, it is to be understod that other generator mode and pump mode embodiments fall within the contemplated scope of the invention.

Figure 10:
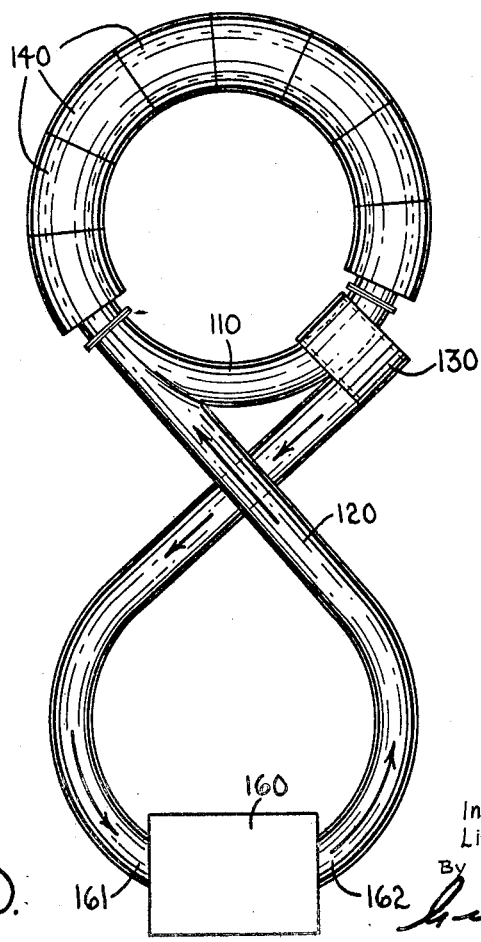
FIGURE 10 is a schematic view of a generator mode embodiment of the novel device for converting D.C. current into A.C. current.

In this connection, FIGURE 10 illustrates a generator mode embodiment of the novel energy conversion device whereby D.C. current can be converted into A.C. current. The pump outlet 162 is connected to the inlet port 120 of the novel device, and the pump intake 161 is connected to the outlet port 130 of the novel device. D.C. current drives fluid pump 160 at a uniform rate, which causes fluid to circulate through the novel energy conversion device to thereby propel the magnetic pistons at a constant orbiting velocity, thus inducing a very pure sinusoidal alternating current in coils 140. Those skilled in the art will, of course, appreciate both the limitations of this embodiment and its advantages in locations where very pure sinusoidal A.C. current is desirable but unavailable. This embodiment would be of special utility for industrial and university research laboratories in rural areas.

The embodiments of the invention in which an exclusive property or privilege is claimed are defined as follows:

1. An energy conversion device including in combination:
   a hollow tubular pipe of circular form in plan to provide an endless tube-like closed circuit;
   at least two pistons of permanently magnetized metal mounted in the pipe, said pistons each constituting a permanently magnetized dipole for free orbit in said tubular pipe, the dipole fields being aligned coaxial with the pistons, sucecssive pistons being oriented to have like poles facing each other;
   said hollow pipe having an inlet port and an outlet port to allow passage of fluid through said continuous passage; and
   energizable windings wound around at least at a part of the hollow tubular pipe, said energy conversion device being operable selectively to convert fluid pressure energy into electrical energy and to convert electrical energy into fluid pressure energy.

2. An energy conversion device according to claim 1, in which the pipe is circular in cross-section and each piston comprsies a body having a longitudinally arcuate axis and a circular cross-section.

3. An energy conversion device according to claim 1, in which the axis of said inlet port is located at a tangent to the hollow pipe at the junction therebetwen.

4. An energy conversion device according to claim 1, in which said coil windings are segregated into discrete, substantially identical segments.

5. An energy conversion device according to claim 4, in which said ratio of the axial length of each segment to the piston axial length being substantially 4:3.

6. An energy conversion device according to claim 4, the coil winding segments being separately and cyclically connected electrically.

7. An energy conversion device according to claim 4, the coil winding segments being separately and cyclically connected electrically.

8. An energy conversion device according to claim 1, said hollow pipe consisting of material having a low magnetic reluctance.

9. An energy conversion device according to claim 1, in which each magnetic piston has a plurality of low friction piston rings therearound to effect a smooth close fit between each piston and the inner surface of the hollow pipe.

10. An energy conversion device according to claim 1 including direct current driven fluid pumping means having a pump inlet connected to said outlet port in a closed fluid path, and a pump outlet connected to said inlet port in a closed fluid path.

References Cited
UNITED STATES PATENTS

| | | |
|---|---|---|
| 1,307,210 | 6/1919 | Newcomb. |
| 2,875,695 | 3/1959 | Justice _____ 103—43 |

ROBERT M. WALKER, Primary Examiner

U.S. Cl. X.R.

310—12